Aug. 8, 1972    J. H. KARRH ET AL    3,682,676
THERMOSETTING RESIN COATINGS
Filed Feb. 24, 1970
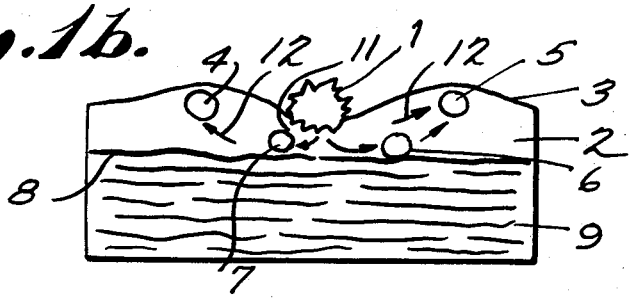
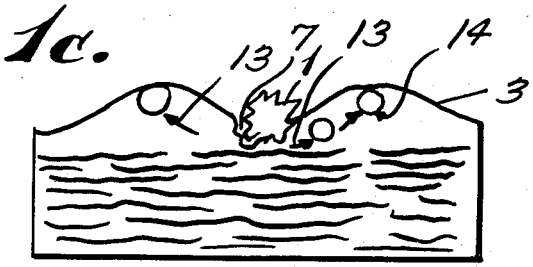
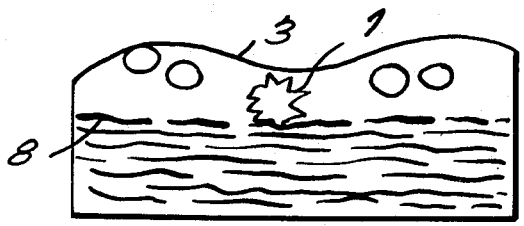
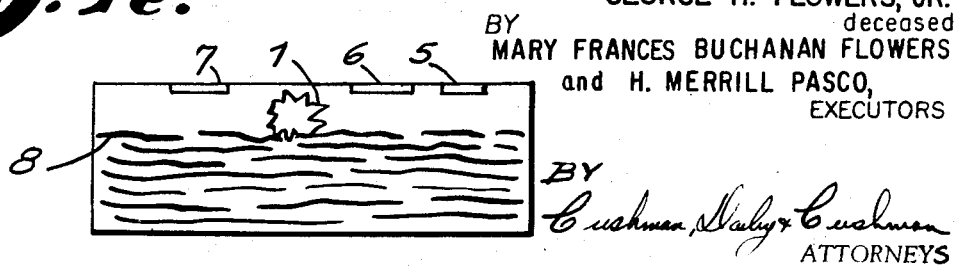
INVENTORS
JOHN H. KARRH
GEORGE H. FLOWERS, JR.
           deceased
BY MARY FRANCES BUCHANAN FLOWERS
and H. MERRILL PASCO,
                EXECUTORS
BY
Cushman, Darby & Cushman
ATTORNEYS United States Patent Office 3,682,676
Patented Aug. 8, 1972

3,682,676
THERMOSETTING RESIN COATINGS
John H. Karrh, R.F.D. 4, Box 74, Powhatan, Va. 23139, and George H. Flowers, Jr., deceased, late of Richmond, Va., by Mary Frances Buchanan Flowers, 37 Chatham Square, 6161 River Road 23226, and H. Merrill Pasco, 18th Floor, 700 E. Main St. 23219 or P.O. Box 1535 23212, executors, both of Richmond, Va.
Filed Feb. 24, 1970, Ser. No. 13,514
Int. Cl. B44d 1/44
U.S. Cl. 117—16                  14 Claims

ABSTRACT OF THE DISCLOSURE

There is provided a thermoplastic resin coating process which produces a coated product that is substantially free of pin holes. The thermoplastic resin is coated on a solid substrate, e.g., the internal surface of a concrete pipe, and finely divided solid particles, having a greatest dimension less than the coating thickness, are impinged on and into the coating, while the coating is in a flowable state, to dislodge and displace from the coating substantially all the gases entrapped in the coating. Thereafter, the coating is gelled and cured. Suitably, the coating is an epoxy resin and the solid particles are finely divided sand which particles have been impinged on the coating at velocities of between 5 and 75 ft./sec.

---

The present invention relates to resin coated surfaces and more particularly to coated conduits such as pipes, ducts, troughs, etc. The invention also relates to a method of producing such articles. Even more particularly, the invention relates to such articles coated with a thermosetting resin, which coating is substantially free from pin holes and like imperfections.

Thermosetting resin coatings are applied to various surfaces and for various purposes, but the major purpose of many such coatings is that of protecting the surface from the deleterious effects of a destructive environment in contact with the surface. For example, many building accessories and industrial structures, e.g., panels, beams, conduits, ducts, etc. are coated with thermosetting resins to protect these accessories and structures from deleterious effects of water (liquid or vapor), corrosive chemicals, reactive gases and liquids. For such applications, the success of protection depends to a large measure on the completeness of the coating on the surface to be protected. If substantial amounts of the surface are not coated, the destructive environment may corrode or otherwise attack the surface causing damage, and in many cases the damaged area will continue to grow underneath the coating and cause the coating to blister and flake away. Of course, such an action is most undesirable and effectively negates the purpose of the coating.

Accordingly, it is imperative that the coating be as complete as possible. A major problem in obtaining a complete coating has been the development in the coating of so-called "pin-holes." These pin-holes result from gases, e.g., air, being entrapped in the coating during application and curing of the coating and then escaping through the surface of the coating during curing thereof, leaving small but very serious holes in the coating. This is a particularly difficult problem when using thermosetting resin coatings, since these coatings are exothermic in curing and generate considerable heat in situ during curing, which heat increases the pressure of entrapped gases and forces a relatively large amount of gases out of the coating resulting in numerous pin-holes. Furthermore, many thermosetting coatings must be heated to accomplish a satisfactory cure, which heating further compounds the problem. Many efforts have been made to eliminate pin-holes. Among such efforts are the use of vacuum, agitation, rotation, and vibration of the coated article during curing to dislodge the entrapped gases prior to gellation of the coating. If the gases are dislodged while the coating is still in a relatively fluid condition, the coating will fill these pin-holes left by the escaping gases. While such approaches work reasonably well for many coated articles, they will not work or are impractical for many other articles. For example, attempting to evacuate, vibrate or agitate a large and heavy structure sufficiently to dislodge entrapped gases is completely unworkable due to the expensive equipment and power which would be required. For example, heavy concrete structures, e.g. panels, pipes and ducts, would require huge equipment and large amounts of power, even assuming the structure could withstand such action.

Under the circumstance, for large heavy articles or articles which cannot withstand vibration, a common approach of the prior art has been to use multiple coatings in order to hopefully fill in the pin-holes which develop in the undercoatings and finally result in a coating which completely covers the surface to be protected. However, such an approach presents serious economic problems, since a major cost of such coated articles resides in the cost of the coating materials and labor for applying the same. Normally, at least two, and preferably three, different coatings have been used in order to insure that the coated article does not contain a substantial amount of pin-holes.

In order to mitigate this increased cost, the prior art has used fillers in the coating to decrease the total amount of thermosetting resin actually used with the multiple coated articles. Fillers, in fact, also provide other benefits aside from the saving in the more costly thermosetting resin. The fillers increase the impact and shattering resistance of such coatings and allow more expansion and contraction without cracking. In other words, the use of fillers to decrease the cost of multiple coatings is not undesirable, but is desirable from a physical properties point of view. Nevertheless, even with the use of fillers, multiple coatings are quite expensive and result in products that can be economically used only when absolutely required.

Also, even with multiple coated articles which are intended mainly for decorative and not primarily for serviceable applications, it is quite often necessary to mechanically work the coatings with squeegees or doctor tools, etc. In this regard, attention is directed to U.S. Pats. 2,861,011 and 2,804,044, which disclosures are incorporated herein by reference for additional background of the invention.

It is therefore an object of the present invention to provide thermosetting resin coated articles which are substantially free of pin-holes and which provide a substantially pin-hole free coating with only one distinct coating. It is a further object to provide articles having multiple thermosetting resin coatings, each of which coating is substantially pin-hole free. A further object is to provide processes for producing the above articles. Other objects will be apparent from the following description and claims.

Briefly stated, according to the present invention, a solid substrate is coated with a thermosetting resin and while the resin is in an uncured state, i.e. flowable and before the gellation state, a finely divided, solid material is impinged against the coating with sufficient velocity and force to substantially penetrate and imbed in and on the coating, whereby entrapped gases are dislodged from the coating and forced to and substantially out of the surface of the coating.

The present inventors have unexpectedly found that when finely divided solid materials are impinged on and into a thermosetting resin coating on a solid substrate, the still relatively fluid coating is caused to flow in random directions and for relatively short distances. During this small but random movement of the coating, entrapped gases are dislodged from the substrate surface of the solid, which has been coated, i.e. at the interface of the coating and the solid substrate, as well as from within the coating itself, and that the dislodged gases are forced to the surface of the coating from which they substantially escape. While the theoretical explanation of this phenomenon is not fully understood, and the inventors are not bound by any theory, it is believed that the finely divided solids first cause, in part, a movement of the fluid resin coating to and then along the substrate surface, which has been coated, and then to the surface of the coating.

In this regard, attention is directed to FIGS. 1(a)–1(e), which is an idealized schematic illustration of the above theory. In FIG. 1(a), a solid, finely divided particle 1, is moved with velocity and force toward the coating 2 having an outer surface 3 and gas bubbles 4 and 5 within the coating and gas bubbles 6 and 7 at the interface 8 between the coating 2 and the solid substrate 9 which has been coated. When the particle 1 first enters the coating 2 (FIG. 1(b)), the coating is moved downwardly toward the interface 8 and outwardly along the interface, as shown by the arrows 11. Further, the coating moves upwardly and outwardly from the bulk thereof, as shown by arrows 12, causing an undulation of surface 3. With this movement, bubbles 6 and 7 are dislodged and moved accordingly, as well as bubbles 4 and 5. With further penetration of the particle (FIG. 1(c)), the movement is continued with more of the coating moving more upwardly, as shown by arrows 13 and 14, with more undulation of surface 3. Also, as shown, the particles may pierce and burst bubbles which they contact as shown in FIG. 1(c) where bubble 7 has burst and expelled from the coating by being contacted by particle 1. After the particle 1 stops, shown as stopped at the interface 8 (FIG. 1(d)), the coating surface 3 begins to recede from the undulations and when at rest (FIG. 1(e)) has moved substantially all the bubbles to the surface, from which the gas can escape by bursting the bubble as a result of the surface tension, or be bursted by other finely divided particles striking the bubbles at or near the surface. Even if some unbroken bubbles remain at the surface, this will not seriously affect the coating, since there is no risk of a pin hole forming which will extend to the interface 8.

The particular thermosetting resin used with the process is not critical and may be selected as desired, and may be simply defined as a liquid resin which when cured is permanently infusible in the finished product. It is only necessary that the thermosetting resin be and remain in a flowable state after application thereof to a substrate for a length of time sufficient to impinge the finely divided particles. In this regard, the flowable state is defined as an absolute viscosity of less than 5000 cps. and preferably less than 500 cps. at the temperature of the resin when impingement takes place. Representative of such resins are the epoxies, polyesters, silicones, polyurethanes, polybutylenes, acrylics, vinyls and other thermosetting resins complexes. Among suitable epoxies are the glycidyl ethers and esters of epichlorohydrin, peracid epoxidation products of polyolefins (cyclic or linear) and expoxidized novolacs, epoxidized unsaturated glycerides, e.g. bisphenol A-epichlorohydrin resins, glycidated novolac resins, tetraphenylol ethane-epichlorohydrin resins, bis (2,3-epoxy-cyclopentyl)ether, vinylcyclohexene dioxide and cycloaliphatic epoxy resin-carboxylate. Suitable curing agents for the epoxies are amines and amine adducts (primary, secondary, and tertiary amines), either of an alkyl or aryl compound, amine terminated polyamide resins, tri-M-p-cresyl borate, acid anhydrides and acid di- and monoglycerides. Other suitable epoxides and curing agents are disclosed in U.S. Pats. 2,528,932 and 2,541,027 as well as at pages 165–171 of Modern Plastics Encyclopedia, McGraw-Hill, New York, N.Y., 1966, which disclosures are incorporated herein by reference. Suitable polyesters and curing agents are disclosed in U.S. Pat. 2,752,275, and suitable silicones resins are described in Silicones, Meals, R. N., and Lewis, F. M., Rienhold Pub. Corp., New York, 1959, especially at pages 63–84, which disclosures are incorporated herein by reference. As will be appreciated from the above, the particular resin is not important as long as it has a viscosity below the above-noted maximum during impingement of the particles.

The particle may be any relatively hard, solid material, but should, of course, be chosen in accordance with the environment to which the coated article is to be in service, i.e., under the conditions used in service, since particles will remain in the coating. The particles are suitably of metallic carbides and nitrides, metallic oxides and metallic powders, carborundum, quartz, mica, asbestos, graphite, diatomite and sand. The particular materials of the particles are not critical and it is only necessary that the particles be sufficiently strong to endure the impingement without a substantial amount of breaking or shattering. The size of the particles is not critical but should be chosen so that the largest dimension of the particle is less than the coating thickness, preferably less than ½ the coating thickness, e.g., ⅟₂₀ to ⅓ the coating thickness. For most applications substantially all of the particles should pass through a 0.065 in. opening (10 Tyler screen, 12 U.S. series) and preferably at least 90% through a 0.40 in. opening (16 Tyler screen, 18 U.S. series). In order that the particles are not too small and become difficult to handle, substantially all the particles should be retained on a 0.003 in. opening (200 Tyler and U.S. series) preferably in a 0.004 in. opening (150 Tyler and 140 U.S. series) and more preferably an 0.0058 in. opening (100 Tyler and U.S. series). Also for best results the particles should have sharp and angular edges to aid in dislodging the entrapped gases during inpingement. Furthermore, any gases evolved during curing of the coating are more easily released in the presence of sharp, angular particles.

The force with which the particles impinge the coating is important and must be at least sufficient to penetrate the surface of the coating but should not be so great as to completely displace the coating from the surface of the substrate. The necessary force can be determined for any particular resin and particle system by simply increasing its force until substantially all the bubbles of gas are dislodged and substantially no pin-holes result in the cured resin. Generally speaking, the velocity of the particles striking the coating should be at least 5 ft./sec., but generally less than 75 ft./sec., e.g., 10 to 50 ft./sec. The amount of particles necessary can be determined as above, but generally speaking, the particles will constitute from about 10 to 85% by weight of the finished coating. Most often and very suitably the particles will constitute from 25% to 70% of the finished coating by weight, e.g., 35–60%.

The coating itself may vary considerably in thickness, e.g., 5–100 mils or greater, but for most purposes from 10 to 50 mils will be sufficient, especially 12–35 mils and preferably 20–30 mils.

The coating may be applied to the substrate in any desired manner, many of which are known to the art, e.g., spraying, brushing, casting, slinging, doctoring, roller coating, curtain coating, etc. Of course, the resin and curing agent must be premixed just prior to application, as is well known in the art. After the particles are impinged on the coating, the coating is cured according to the particular resin and curing agent used, e.g., from room temperature or slightly below to 300° F. or higher. Similarly, the curing time will vary considerably, e.g., ½ hr. to 12 hrs. All of the curing schedules for use with the present invention are well known in the art and further elaboration is not necessary.

The particles may be impinged on the coating by any desired mechanical or pneumatic means or by hand if desired. It is only necessary that the requisite velocity of the particles be developed and that a fairly uniform distribution thereof be accomplished. For example, an air gun, a rotating disc, revolving blades, vanes or cylinders may be used.

The present invention is particularly applicable to internally coating of concrete pipes and the like. Coated concrete pipes are used in a wide variety of services from that of water and sewage to sulfuric acid solutions. Coatings for such pipes vary in thickness, resin, curing agent and filler used. For example, minimum thickness of a coating necessary to meet the specifications of the National Sanitation Foundation is 12 mils.

However, in connection with concrete pipes and the like, it is important to note that the particular method of the heating of such during the process is most critical in order to avoid pin holes, blistering and like defects in the resin coating. The inventors have unexpectedly found that porous and semi-porous substrates, e.g., concrete, plaster, composite laminates, wood, etc, must be heated, when heating is indeed required, from the side thereof which has the resin coating thereon. It was discovered that porous (the term is intended to include semi-porous) substrates will naturally absorb and, in equilibrium with ambient air, contain small amounts of water, e.g., up to 10% or 20%. For many applications of the invention it is desirable to heat the substrate during at least one step of the process, e.g., preheating, heating during application of the resin and/or impinging of the particles, heating during gellation and heating to cure the resin. If the heating is accomplished by heating the side of the substrate opposite the side having or will have the resin thereon, the heating causes the water in the porous substrates to move toward the side thereof having the resin coating thereon and the water, in vapor form, will penetrate the uncured resin coating causing bubbles and/or blisters thereon. For example, with an internally resin coated concrete pipe, it is important that any heating performed be from the inside of the pipe and not from the outside. In this connection it is also important to note that if a freshly coated concrete pipe is placed in the hot sun before the resin coating is substantially cured, the hot sun on the outside of the pipe will effectively act as a heating means to heat the pipe from the outside. Accordingly, such should be avoided.

Of course, however, if the substrate is non-porous, e.g. metals and the like, the above noted problem does not arise and heating may be accomplished from either side of the substrate.

The following examples will illustrate the present invention, but it is to be understood that the invention is fully applicable to the foregoing disclosure and not limited to the examples. In the examples all percentages are by weight, unless otherwise noted.

EXAMPLE 1

A concrete pipe, 20 ft. long and 4 ft. in diameter and having a 5-ft. diameter bell was laid horizontally on a plurality of rollers, two of which were motor driven. The r.p.m. of the rollers could be varied to provide 2 to 20 feet per minute linear speed of rotation of the pipe, and the rollers were adjustable to accommodate different diameters and length of pipe. An "I" beam trolley track was disposed through the bore of the pipe and offset from the axis of the pipe so that it was approximately paralleled with the axis but only about 1 ft. from the inside wall of the pipe. The "I" beam was supported outside of the pipe at its ends by an "A" frame. Of course, the trolley track could be any monorail type of device, e.g., a channel, angle iron, etc., and the support members could be other than an "A" frame, e.g., strain rods, concrete pillars, etc. A motor driven wheeled trolley was mounted on the trolley track. A container for the particles was mounted on the trolley with a gravity feed conduit opening adjacent to a slinger. The slinger was a series of curved vanes mounted on a backing plate. The particles were dropped from the feed into the vanes, and which when being revolved slung out the particles. However, the feed could, alternately, empty into a centrally located orifice on the back-up plate and operate much like a centrifugal pump. Of course, an end plate, partially enclosing the vanes between the end plate and back-up plate may be used. The motor for the trolley was a variable speed motor which could drive the trolley wheels at desired speeds, e.g., 1–12 ft./min. Of course, the trolley could be operated by cables and a motor or hand outside of the pipe. A flexible hose was disposed from a resin pump outside of the pipe to the trolley and connected to a nozzle which empties adjacent the slinger, for slinging the resin. Alternately, a stationary pipe with multiple spray nozzles could traverse the inside of the concrete pipe if desired. Gas burners were mounted along the trolley track and supplied with gas by a stationary gas pipe. Of course, any desired means of heating the pipe could be used, e.g., electrical heater, I.R. lamps, hot gases, etc. A conventional resin/catalyst mixing apparatus supplied premixed resin to the pump which feeds the flexible hose and nozzles adjacent the slinger.

The pipe was cleaned by sandblasting while rotating at 4 r.p.m. The pipe was then preheated at almost 80° F. by means of the gas burners. A premixed epoxy resin (diglycidyl ether of bisphenol A and diethylene triamine with a slight excess of the amine), was slung on the interior of the pipe by pumping the resin to the slinger and slinging the epoxy resin. The concrete pipe was rotated at 4 r.p.m. during the resin application. The motor driven trolley was moved through the pipe and then reversed and moved out of the pipe at almost 4 ft. per min. The resin application was continued until the resin coating was about 20 mils thick. The gravity feed of particles was released on the trolley and the particles were slung on and into the resin coating by the slinger at a velocity of about 20 ft./second. The particles used were finely divided sand having the following U.S. series sieve analysis:

| Sieve No.: | Percent passing through |
|---|---|
| 16 | 95–100 |
| 30 | 70–95 |
| 50 | 5–20 |
| 100 | 0–1 |

The particles were applied until the particles constituted about 40% of the resulting coating. The pipe was then heated continuously at 85° F. for 30 minutes at which time the coating had gelled. After gelling, the pipe was allowed to further cure at almost room temperature for 72 hours, before being put into service. The pipe showed no evidence of pin-holes and after 4 months in service with diluted sulphuric acid the coating was unharmed.

As will be appreciated from the above, the particular thermosetting resin and catalysts therefor, as well as the particular substrate and particles are not critical to the invention. One skilled in the art may choose these materials with which the process is to be practiced, depending on the service desired. For any particular resin, may catalysts and cure schedules are known to the art and further elaboration is not necessary, especially since the particular choices are not critical to the invention and may be desired. It is only necessary that the properties of the resin, i.e., viscosity, and the properties of the particles, as noted above, be observed and practiced. Similarly, the particular means of applying the resin and particles are not crtical and may be accomplished in any desired way. The whole process may be carried out by hand if so desired.

EXAMPLES 2–11

In order to demonstrate the advantage of the present invention, five samples, Examples 2–6, were prepared by hand mixing an epoxy resin (diglycidyl ether of bisphenol A) and a slight excess of diethylene triamine and hand brushing a 25 mil coating of the resin on the inside surface of concrete bowls. Sand having the same sieve analysis as in Example 1 was impinged at 20 ft./sec. on the coating with a conventional air gun until the resulting coating contained 50% sand. The bowls were hand rotated until the epoxy gelled into a uniform coating. The bowls were cured for 20 minutes at 80° F. and then allowed to set at room temperature for 72 hours.

Five additional bowls, Examples 7–11, were coated using the same materials and techniques except that the sand was mixed into the epoxy resin before application to the bowls to give a resulting mixture that was 50% sand, and not impingement into a coating as according to the invention.

Into all ten bowls was placed a 10% aqueous solution of sulphuric acid and the bowls were capped to prevent evaporation and kept at room temperature. At the end of the periods shown in the following table the acid was removed, the bowls rinsed with water and inspected. The results are also noted in the table.

| Example | Period, days | Condition of coating |
|---|---|---|
| 2 | 5 | Undamaged. |
| 3 | 10 | Do. |
| 4 | 15 | Do. |
| 5 | 20 | Do. |
| 6 | 40 | Do. |
| 7 | 5 | Do. |
| 8 | 10 | Slight damage. |
| 9 | 15 | Blistering. |
| 10 | 20 | Heavy blistering. |
| 11 | 40 | Flaking. |

It should be understood that while the present invention provides a superior single coating, the invention may be used to build up multi-layered coatings if desired, e.g. for very thick coating, and multi-layered coatings are intended within the scope of the present invention. It should be further understood that all of the layered coatings are not necessarily accomplished according to the invention, so long as one of the coatings is according to the invention. For example, after a first coating is applied according to the invention, additional coatings may be applied which may or may not contain particles as filler and may be decorative or ornamental in nature or may even be of different materials, e.g., thermoplastics, rubber, etc. As will be appreciated from the above, various modifications will be readily apparent to those skilled in the art and these modifications are intended to be embraced by the invention. Accordingly, the invention is limited only by the spirit and scope of the following claims.

What is claimed:

1. In a process for applying a thermosetting resin coating to the interior of a pipe comprising applying to the pipe a fluid thermosetting resin coating, rotating the pipe, impinging into and on the said coating while the coating is in a fluid state a plurality of solid, finely divided particles of dimensions less than the thickness of the coating, with sufficient velocity to substantially pierce, dislodge and displace from the fluid resin coating substantially all of the gases entrapped in the said coating at the pipe interior/coating interface and in the coating, said particles being impinged at a velocity of at least 5 ft./sec. and in a sufficient quantity to result in the particles constituting about 10% to 85% by weight of the fluid coating.

2. The process of claim 1 wherein the resin is selected from the group consisting of epoxies, polyesters and silicones, and the particles are selected from the group consisting of metallic carbides and nitrides, metallic oxides and metallic powders, carborundum, quartz, mica, asbestos, graphite, diatomite and sand.

3. The process of claim 1 wherein the particles are impinged at a velocity of up to 75 ft./sec.

4. The process of claim 1, wherein the resin coating is subsequently cured.

5. The process of claim 4 wherein heating of the pipe is carried out during at least one step of the process.

6. The process of claim 5 wherein the pipe is porous and the said heating is accomplished by heating the interior of the pipe which carries the resin coating.

7. The process of claim 6 wherein the porous substrate is a concrete pipe and the heating is accomplished by heating the concrete pipe internally.

8. The process of claim 1 wherein the coating, during the impingement by the particles has a viscosity of less than 5000 cps.

9. The process of claim 8 wherein the viscosity is less than 500 cps.

10. The process of claim 1 wherein the velocity of the particles is at least 10 ft./sec.

11. The process of claim 10 wherein the velocity is between 10 and 50 ft./sec.

12. The process of claim 1 wherein the thickness of the coating is 5 to 100 mils and the largest dimension of the particles is less than ½ the thickness of the coating.

13. The process of claim 12 wherein the particles are less than ⅓ the thickness of the coating.

14. The process of claim 1 wherein the resin is an epoxy resin.

References Cited

UNITED STATES PATENTS

| 3,016,875 | 1/1962 | Ballentine et al. | 117—18 |
| 3,288,171 | 11/1966 | Hucks | 138—145 |
| 3,080,253 | 3/1963 | Dietz et al. | 117—18 |
| 3,140,195 | 7/1964 | Nagel | 117—26 |
| 3,360,391 | 12/1967 | Richtzenhain | 117—26 |
| 3,085,025 | 4/1963 | Eaton | 117—9 |
| 2,330,365 | 9/1943 | Jackson | 117—26 |
| 3,211,584 | 10/1965 | Ehrreich | 117—31 |
| 1,565,122 | 12/1925 | Time | 117—26 |

FOREIGN PATENTS

| 1,066,203 | 4/1967 | Great Britain | 138—146 |

MURRAY KATZ, Primary Examiner

R. M. SPEER, Assistant Examiner

U.S. Cl. X.R.

117—9, 10, 18, 31, 33, 62, 104; 138—145, 146